United States Patent [19]
Lutz

[11] Patent Number: 6,047,262
[45] Date of Patent: Apr. 4, 2000

[54] METHOD FOR PROVIDING SECURITY AND ENHANCING EFFICIENCY DURING OPERATION OF A SELF-SERVICE CHECKOUT TERMINAL

[75] Inventor: Dusty L. Lutz, Lawrenceville, Ga.

[73] Assignee: NCR Corporation, Dayton, Ohio

[21] Appl. No.: 09/032,933

[22] Filed: Mar. 2, 1998

[51] Int. Cl.$^7$ ..................................................... G06K 7/10
[52] U.S. Cl. ........................... 705/16; 705/18; 705/64; 705/73; 713/152; 713/166; 713/200
[58] Field of Search ............................... 235/383; 380/24, 380/23; 705/73, 16, 26, 18, 414, 64, 72, 60, 418; 713/152, 166, 200

[56] References Cited

U.S. PATENT DOCUMENTS

| | | | |
|---|---|---|---|
| 5,493,613 | 2/1996 | Denno et al. | 380/24 |
| 5,877,485 | 3/1999 | Swartz | 235/383 |

FOREIGN PATENT DOCUMENTS

| | | | |
|---|---|---|---|
| 0 905 658 | 3/1999 | European Pat. Off. | G07F 11/00 |

*Primary Examiner*—Emanuel Todd Voeltz
*Assistant Examiner*—Raquel Alvarez
*Attorney, Agent, or Firm*—Maginot, Addison & Moore

[57] ABSTRACT

A method of providing security for a self-service checkout terminal includes the step of determining a time-of-day value and a day-of-week value. The method also includes the step of operating the terminal at a first security level if (i) the time-of-day value is within a first predetermined time-of-day range, and (ii) the day-of-week value is within a first predetermined day-of-week range. The method further includes the step of operating the terminal at a second security level if (i) the time-of-day value is within a second predetermined time-of-day range, and (ii) the day-of-week value is within a second predetermined day-of-week range.

16 Claims, 6 Drawing Sheets

6,047,262

METHOD FOR PROVIDING SECURITY AND ENHANCING EFFICIENCY DURING OPERATION OF A SELF-SERVICE CHECKOUT TERMINAL

TECHNICAL FIELD OF THE INVENTION

The present invention relates generally to a retail checkout terminal, and more particularly to a method for providing security and enhancing efficiency during operation of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer or user without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security. Such security includes preventing a customer from either inadvertently or intentionally placing an item in a grocery bag without scanning the item, or voiding one item from entry, but removing a second item of lesser value, or no item at all, from the grocery bag. Thus, another concern when evaluating a self-service checkout terminal is the level of security provided against illicit use of the terminal by customers.

Therefore, self-service checkout terminals have heretofore been designed with security systems which monitor the use of the terminal. For example, weight scales have been incorporated into self-service checkout terminals to monitor the manner in which a customer handles or otherwise processes items during operation of the terminal. In addition, video systems, which include a number of video cameras, have been utilized in a number of self-service checkout terminals which have heretofore been designed. Such security systems typically monitor the customer's use of the terminal by maintaining a number of electronic logs or counters. In particular, if the security system detects a security violation (e.g. a weight change on one of the weight scales associated with an item being placed into a grocery bag without having first been properly entered in the terminal), a processing unit associated with the security system increments one or more electronic logs. Thereafter, the processing unit determines if the resultant value of the electronic log or logs equals or exceeds a predetermined threshold value associated therewith. It should be appreciated that during operation of the self-service checkout terminal, if the value of any of the electronic logs associated with the security system equals or exceeds its predetermined threshold, intervention by store personnel such as a customer service manager may be requested by the terminal.

Such security systems have a number of drawbacks associated therewith. For example, certain security systems which have heretofore been designed may disadvantageously reduce both the efficiency and throughput associated with the self-service checkout terminal. More specifically, certain security systems which have heretofore been designed require a customer to position an item in a particular area, such as a bagging area, after entry thereof into the terminal. Such a requirement allows the terminal to verify the identity of the item (e.g. by determining the weight of the item with a weight scale positioned in the bagging area and thereafter comparing the measured weight to a known weight), but may force the customer to perform an undesired, inefficient step during the checkout procedure. For example, if the customer scanned a pack of gum, the customer may wish to place the gum in his or her pocket, but may first be required to place the gum in the bagging area in order to weigh the gum prior to removing the gum from the bagging area and placing it in his or her pocket. It should be appreciated that such a requirement (i.e. placing the gum in the bagging area) increases the amount of time necessary to perform the transaction thereby decreasing the customer's efficiency during operation of the self-service checkout terminal.

In addition, if store personnel is summoned a number of times during a given checkout procedure as the result of the predetermined threshold values of one or more of the various electronic logs associated with the security system being exceeded, the amount of time necessary to complete the checkout procedure is increased thereby decreasing the customer's efficiency during operation of the self-service checkout terminal.

Moreover, it is known that a number of retailers disable the security system associated with certain self-service checkout terminals which have heretofore been designed as a result of such inefficiencies. In particular, during periods of time in which the terminal is experiencing relatively high usage, a number of retailers have been known to completely disable the security system associated with the self-service checkout terminal thereby disadvantageously allowing certain improprieties, such as theft or repeated unintentional misuse, to go undetected by the terminal.

What is needed therefore is a self-service checkout terminal which overcomes one or more of the above-mentioned drawbacks. What is also needed is a self-service checkout terminal which adjusts this security level at which the terminal is being operated during periods of high usage so as to increase the efficiency of the terminal.

SUMMARY OF THE INVENTION

In accordance with a first embodiment of the present invention, there is provided a method of providing security for a self-service checkout terminal. The method includes the step of determining a current time value. The method also includes the step of operating the terminal at a first security level if the current time value is within a first predetermined time range. The method further includes the step of operating the terminal at a second security level if the current time value is within a second predetermined time range.

In accordance with a second embodiment of the present invention, there is provided a method of providing security for a self-service checkout terminal. The method includes the step of determining a time-of-day value and a day-of-week value. The method also includes the step of operating the terminal at a first security level if (i) the time-of-day value is within a first predetermined time-of-day range, and (ii) the day-of-week value is within a first predetermined day-of-week range. The method further includes the step of operating the terminal at a second security level if (i) the time-of-day value is within a second predetermined time-of-day range, and (ii) the day-of-week value is within a second predetermined day-of-week range.

In accordance with a third embodiment of the present invention, there is provided a method of providing security for a self-service checkout terminal. The method includes the step of detecting a terminal parameter value. The method also includes the step of operating the terminal at a first security level if the terminal parameter value is within a first predetermined terminal parameter range. The method further includes the step of operating the terminal at a second security level if the terminal parameter value is within a second predetermined terminal parameter range.

It is therefore an object of the present invention to provide a new and useful self-service checkout terminal.

It is a further object of the present invention to provide an improved self-service checkout terminal.

It is yet another object of the present invention to provide a new and useful method of providing security for a self-service checkout terminal.

It is moreover an object of the present invention to provide an improved method of providing security for a self-service checkout terminal.

It is moreover an object of the present invention to provide a self-service checkout terminal which selectively adjusts the security level at which the terminal is being operated based on the level of usage of the terminal.

The above and other objects, features, and advantages of the present invention will become apparent from the following description and the attached drawings.

DETAILED DESCRIPTION OF THE INVENTION

Figure 1:
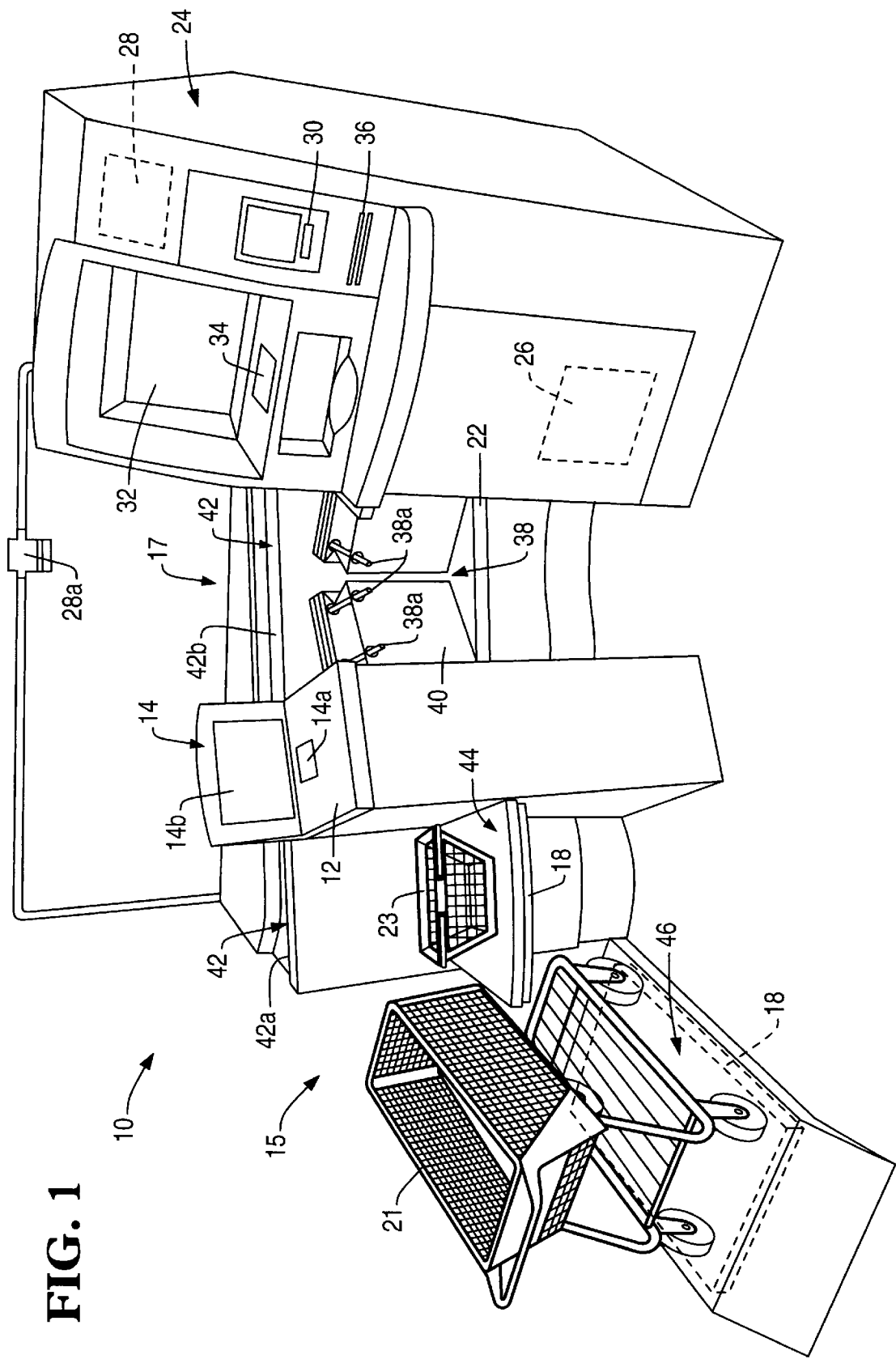
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
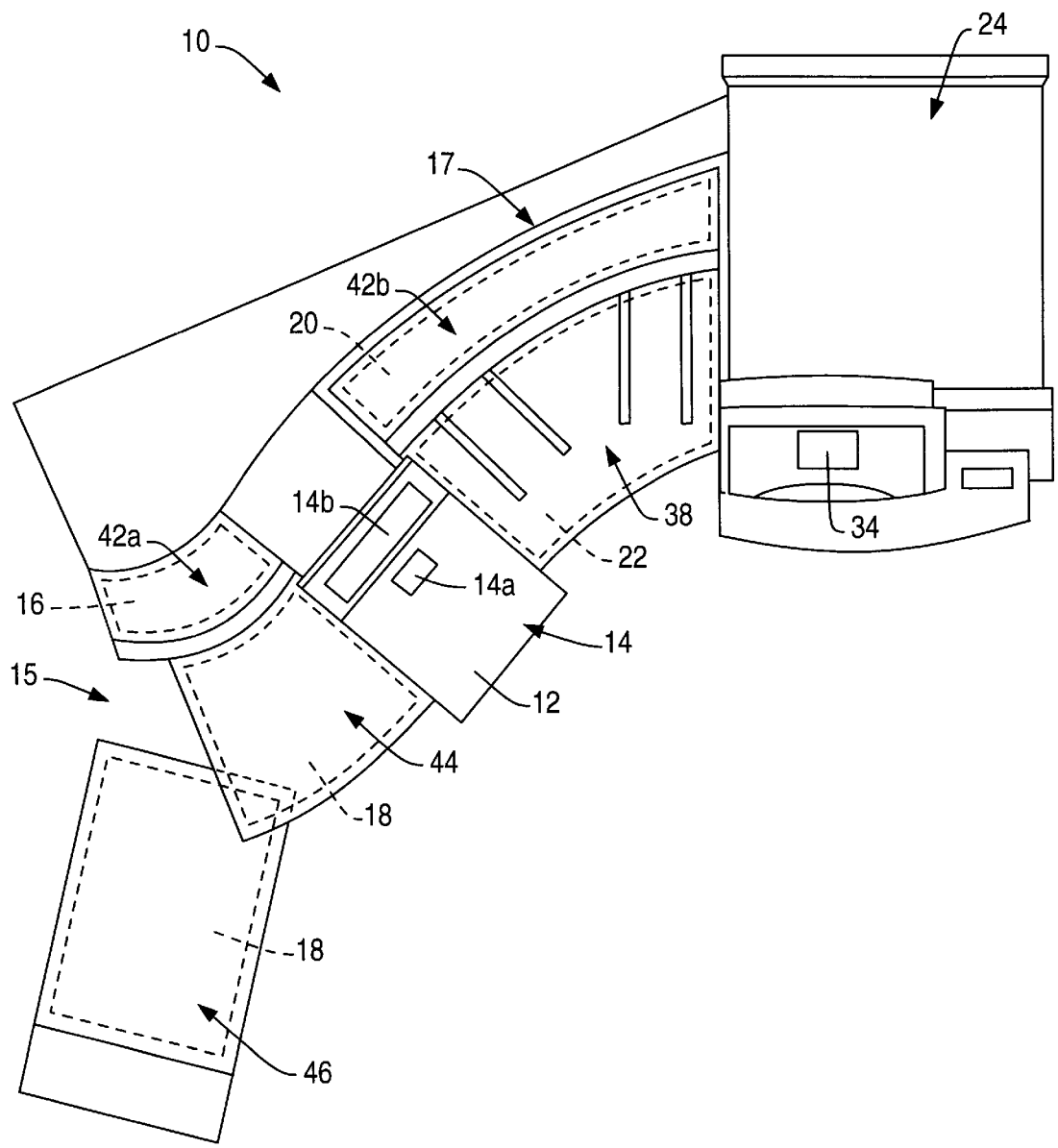
FIG. 2 is a top elevational view of the self-service checkout terminal of FIG. 1 (note that the grocery cart 21, the grocery hand basket 23, the video camera 28a, and the grocery bags 40 have been removed for clarity of description)

Referring now to FIGS. 1 and 2, there is shown a self-service checkout terminal 10 for use in a retail business such as a grocery store. The self-service checkout terminal 10 includes a product scale 12, a scanner 14, a pre-scan shelf scale 16, a cart/basket scale 18, a post-scan shelf scale 20, a bagwell scale 22, an automated teller machine (ATM) 24, and a processing unit 26. The ATM 24 includes a video system 28, a card reader 30, a display monitor 32, a data input device 34, and a printer 36.

The self-service checkout terminal 10 also includes a bagwell 38 for accommodating one or more grocery bags 40, a counter 42, and a basket shelf 44. The counter 42 defines an arcuate surface as shown in FIG. 2. Such an arcuate surface allows the counter 42 to be positioned relatively close to both the scanner 14 and the bagwell 38 thereby permitting the counter 42 to function as a "set-aside surface" for use by the user during operation of the self-service checkout terminal 10. Such set-aside surfaces are necessary to allow the user to selectively choose the order in which items are scanned or otherwise entered. Moreover, such set-aside surfaces are necessary to allow a user to selectively choose the order in which items are loaded into the grocery bags 40. For example, if the user scanned a loaf of bread, the user may wait to load the bread into the grocery bag 40 until the bag is nearly full thereby preventing the bread from being crushed. As alluded to above, it may be desirable to use the set-aside surfaces both before and after an item has been scanned or otherwise entered. Hence, as shown in FIG. 2, the scanner 14 divides the counter 42 into a pre-scan set-aside surface or shelf 42a, and a post-scan set-aside surface or shelf 42b. In particular, the scanner 14 divides the counter 42 into the pre-scan set-aside shelf 42a which is upstream of the scanner 14, and the post-scan set-aside shelf 42b which is downstream from the scanner 14. The terms "upstream" and "downstream" are used to be consistent with the flow of items through the self-service checkout terminal 10 during a typical checkout procedure. In particular, an item enters at the area proximate the pre-scan set-aside shelf 42a then flows in a downstream direction to be scanned at the scanner 14 so as to enter a product code associated with the item. Once the product code associated with the item is entered, the item flows from the scanner 14 in a downstream direction to the post-scan set-aside shelf 42b or the bagwell 38.

The bagwell 38 is disposed between the scanner 14 and the ATM 24 as shown in FIG. 1. The bagwell 38 includes a number of posts 38a which cooperate to support a number of the grocery bags 40. The bagwell 38 is configured to allow two or more grocery bags 40 to be accessed by the user at any given time. In particular, the posts 38a are of a sufficient length to secure a number of unopened grocery bags 40 along with two or more opened grocery bags 40 thereby allowing a user to selectively load various item types into the grocery bags 40. For example, the user may desire to use a first grocery bag 40 for household chemical items such as soap or bleach, and a second grocery bag 40 for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14*a* and a second scanning window 14*b*. The first scanning window 14*a* is disposed in a substantially horizontal manner, whereas the second scanning window 14*b* is disposed in a substantially vertical manner, as shown in FIG. 1. The product scale 12 is integrated with the scanner 14. More specifically, the product scale 12 is disposed substantially parallel to the scanning window 14*a* thereby enveloping the scanning window 14*a*. If an item such as produce is placed upon the product scale 12 or the first scanning window 14*a*, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The pre-scan shelf scale 16 is positioned in order to determine the weight of an item or items positioned on the pre-scan shelf 42*a*. In particular, if a user removes an item from the pre-scan shelf 42*a* in order to scan or otherwise enter the item into the self-service checkout terminal 10, the pre-scan shelf scale 16 may be used to determine the weight of the item by detecting a weight decrease associated with removal of the item from the pre-scan shelf 42*a*. Moreover, the pre-scan shelf 42*a* functions as a "return area" of the self-service checkout terminal 10. More specifically, if the user voids an item from entry during the checkout procedure, the user is instructed via a message displayed on the display monitor 32 to position the voided item on the pre-scan shelf 42*a*. Hence, the pre-scan shelf scale 16 may be used to determine the weight associated with the voided item by detecting a weight increase associated with placement of the voided item on the pre-scan shelf 42*a*.

The cart/basket scale 18 is positioned in order to determine the weight of an item or items positioned in either (1) a grocery cart 21 positioned on a cart unloading platform 46, and/or (2) a grocery hand basket 23 positioned on the basket shelf 44. In particular, if a user removes an item from either the grocery cart 21 or the grocery hand basket 23 in order to scan or otherwise enter the item into the self-service checkout terminal 10, the cart/basket scale 18 may be used to determine the weight of the item by detecting a weight decrease associated with removal of the item from either the grocery cart 21 or the grocery hand basket 23, respectively. It should be appreciated that the cart/basket scale 18 may be embodied as two separate scales (i.e. a first scale for detecting weight changes on the cart unloading platform 46, and second scale for detecting weight changes on the basket shelf 44), or may preferably be embodied as a single, integrated weight scale which is mechanically coupled to both the cart unloading platform 46 and the basket shelf 44.

From the above discussion, it should be appreciated that the pre-scan shelf scale 16 and the cart/basket scale 18 cooperate to monitor placement of items into, and removal of items from, a pre-scan area 15 associated with the self-service checkout terminal 10. What is meant herein by the term "pre-scan area" is the area associated with the self-service checkout terminal 10 in which items may be placed prior to being scanned or otherwise entered into the self-service checkout terminal 10. For example, the pre-scan area 15 includes the pre-scan shelf 42*a*, the cart unloading platform 46, and the basket shelf 44.

The post-scan shelf scale 20 is positioned in order to determine the weight of an item or items positioned on the post-scan shell 42*b*. In particular, if a user places an item on the post-scan shelf 42*b*, the post-scan shelf scale 20 may be used to determine the weight of the item by detecting a weight increase associated with placement of the item on the post-scan shelf 42*b*. Alternatively, if a user removes an item from the post-scan shelf 42*b*, the post-scan shelf scale 20 may be used to determine the weight of the item by detecting a weight decrease associated with removal of the item from the post-scan shelf 42*b*.

The bagwell scale 22 is positioned in order to determine the weight of an item or items positioned in the grocery bags 40. In particular, if a user places an item in one of the grocery bags 40, the bagwell scale 22 may be used to determine the weight of the item by detecting a weight increase associated with placement of the item in the grocery bag 40. Alternatively, if a user removes an item from one of the grocery bags 40, the bagwell scale 22 may be used to determine the weight of the item by detecting a weight decrease associated with removal of the item from the grocery bag 40.

From the above discussion, it should be appreciated that the post-scan shelf scale 20 and the bagwell scale 22 cooperate to monitor placement of items into, and removal of items from, a post-scan area 17 associated with the self-service checkout terminal 10. What is meant herein by the term "post-scan area" is the area associated with the self-service checkout terminal 10 in which items may be placed subsequent to being scanned or otherwise entered into the self-service checkout terminal 10. For example, the post-scan area 17 includes the post-scan shelf 42*b* and the bagwell 38 (including the grocery bags 40 therein). Moreover, it should be further appreciated that the post-scan shelf scale 20 and the bagwell scale 22 may be embodied as two separate scales, or may alternatively be embodied as a single, integrated weight scale which is mechanically coupled to both the base of the bagwell 38 and the post-scan shelf 42*b*.

The display monitor 32 displays instructions which serve to guide a user through a checkout procedure. For example, an instruction is displayed on the display monitor 32 which instructs the user to remove an item from the grocery cart 21 and enter the item into the self-service checkout terminal 10 by (1) passing the item over the scanner 14, or (2) placing the item on the product scale 12 in order to obtain the weight of the item. The display monitor 32 may be a known touch screen monitor which can generate data signals when certain areas of the screen are touched by a user.

Figure 3:
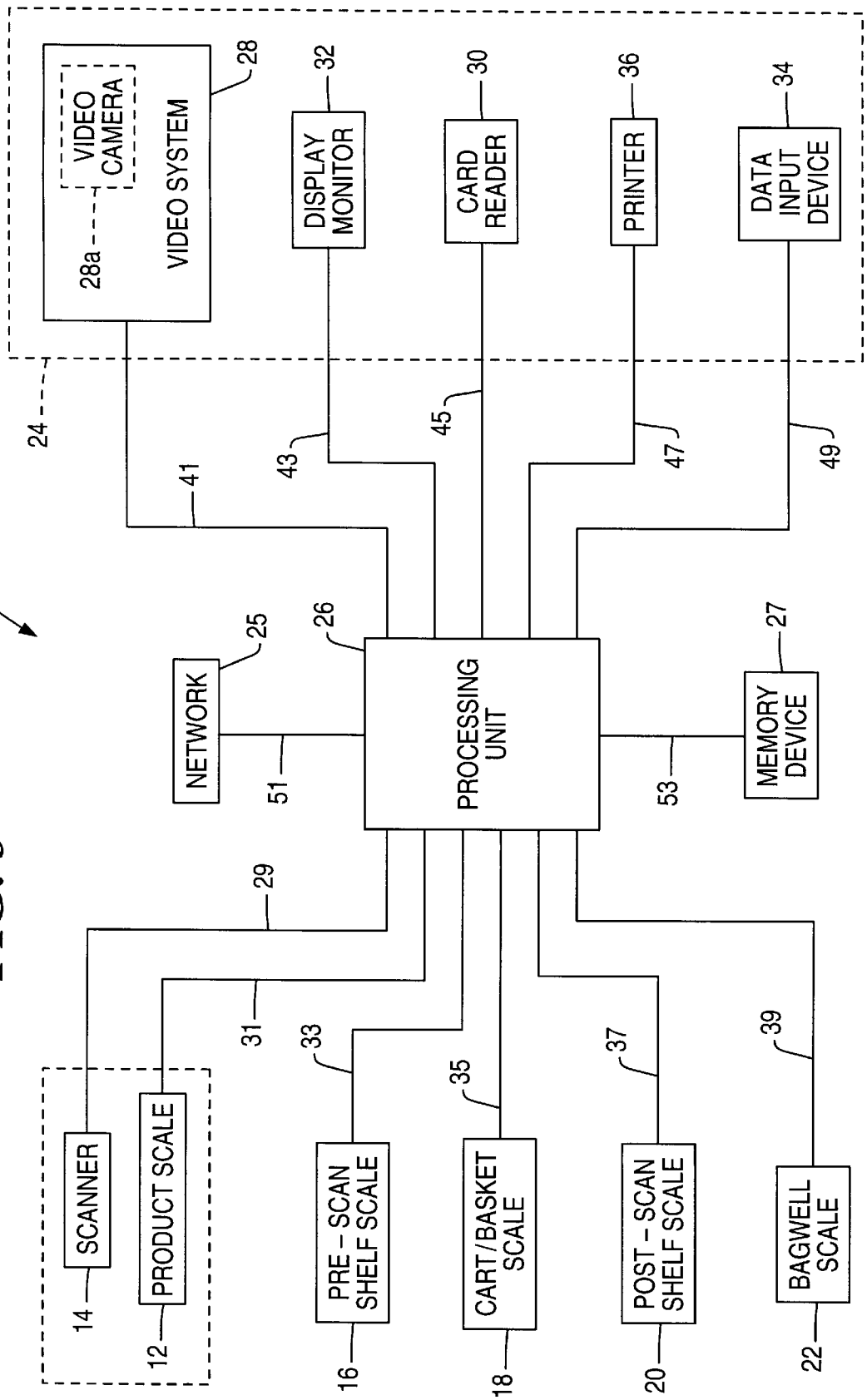
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the pre-scan shelf scale 16, the cart/basket scale 18, the post-scan shelf scale 20, the bagwell scale 22, the video system 28, the card reader 30, the display monitor 32, the data input device 34, and the printer 36. The processing unit 26 is also electrically coupled to a network 25 and a memory device 27 as shown in FIG. 3.

The processing unit 26 monitors output signals generated by the scanner 14 via a communication line 29. In particular, when the user of the self-service checkout terminal 10 scans an item which includes a bar code across the scanning windows 14a, 14b, an output signal is generated on the communication line 29

The processing unit 26 is coupled to the product scale 12 via a data communication line 31. In particular, when an item is placed thereon, the product scale 12 generates an output signal on the data communication line 31 indicative of the weight of the item.

The processing unit 26 is coupled to the pre-scan shelf scale 16 via a data communication line 33. In particular, when an item is placed on the pre-scan shelf 42a, the pre-scan shelf scale 16 generates an output signal on the data communication line 33 indicative of the weight of the item. Similarly, when an item is removed from the pre-scan shelf 42a, the pre-scan shelf scale 16 generates an output signal on the data communication line 33 indicative of the weight of the removed item.

The processing unit 26 is coupled to the cart/basket scale 18 via a data communication line 35. In particular, when an item is removed from either the grocery cart 21 or the grocery hand basket 23, the cart/basket scale 18 generates an output signal on the data communication line 35 indicative of the weight of the removed item.

The processing unit 26 is coupled to the post-scan shelf scale 20 via a data communication line 37. In particular, when an item is placed on the post-scan shelf 42b, the post-scan shelf scale 20 generates an output signal on the data communication line 37 indicative of the weight of the item. Similarly, when an item is removed from the post-scan shelf 42b, the post-scan shelf scale 20 generates an output signal on the data communication line 37 indicative of the weight of the removed item.

The processing unit 26 is coupled to the bagwell scale 22 via a data communication line 39. In particular, when an item is placed in one of the grocery bags 40, the bagwell scale 22 generates an output signal on the data communication line 39 indicative of the weight of the item added to the grocery bag 40. Similarly, when an item is removed from one of the grocery bags 40, the bagwell scale 22 generates an output signal on the data communication line 39 indicative of the weight of the item removed from the grocery bag 40.

The processing unit 26 communicates with the video system 28 via a communication line 41. The video system 28 includes a video camera 28a (see also FIG. 1), and is included in the self-service checkout terminal 10 to enhance the security thereof. The video system 28 may be a known closed-circuit video system which displays video images on a portion of the display monitor 32. Alternatively, the video system 28 may be configured to include the hardware and software necessary to provide motion pattern recognition thereby providing security to the self-service checkout terminal 10 by monitoring the video images generated by the video system. In particular, the video system 28 may include a frame grabber (not shown) and a processing system (not shown) such as a personal computer (PC). The PC and the frame grabber are collectively referred to as a video processor. The video processor receives a standard video signal format, such as RS-170, NTSC, CCIR, or PAL, from the video camera 28a.

Video output signals from the video camera 28a are input to the frame grabber. The frame grabber operates to convert the analog video signals from the video camera 28a into a digital image which is stored within a memory for subsequent processing by the video processor. Once representations of the stream of digital images from the video camera 28a are sequentially stored in memory, the video processor may begin to analyze or otherwise process the video image in order to monitor the manner in which the user handles items during operation of the self-service checkout terminal 10. For example, the video system 28 may be used to determine if the user moves an item in a manner indicative of an attempt to scan the item with the scanner 14. One video system 28 which is suitable for use in the present invention is disclosed in U.S. Provisional Patent Application Serial No. 60/045,001 entitled "Motion Pattern Recognition for a Self Checkout System" which was filed on Feb. 7, 1997, by Ralph Crabtree, which is incorporated herein by reference, and which is assigned to the same assignee as the present invention.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the user touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, the instructional messages may be generated with a voice generating device (not shown) or an audible tone generating device (not shown).

The data input device 34 is coupled to the processing unit 26 through a data communication line 49. The data input device 34 may include one or more of a known keypad or a touch pad. In addition, the processing unit 26 is coupled to the printer 36 via a data communication line 47. The printer 36 may be used to print a receipt at the end of a given checkout procedure. Moreover, the card reader 30 is coupled to the processing unit through a data communication line 45. The card reader 30 may include a known credit and/or debit card reader, or a smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to communicate with a paging system (not shown) or the like which pages or otherwise alerts the retailer's personnel as described further below. In addition, the processing unit 26 communicates with the network 25 to obtain information such as pricing information on an item being scanned or weighed, and also to verify user credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain an electronic transaction table which includes a record of the product information associated with each item that is scanned, weighed, or otherwise entered during the user's use of the self-service checkout terminal 10. For example, if the user scans a can of soup, the description of the soup and the pricing information associated therewith is recorded in the transaction table in the memory device 27. Similarly, if the user weighs a watermelon with the product scale 12 and then enters a product lookup code associated with watermelon via the data input device 34, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on the printer 36 thereby generating a receipt for the user at the end of his or her transaction.

The memory device 27 is also provided to maintain a number of electronic logs associated with operation of the self-service checkout terminal 10. More specifically, the memory device 27 electronically maintains a number of event logs each of which respectively tracks or otherwise tallies the number of occasions in which the user operates the self-service checkout terminal 10 in a particular manner. An event log may be provided to track those occasions in which the user unintentionally operated the self-service checkout terminal 10 improperly, along with those occasions in which it can be inferred with a high degree of confidence that the user intentionally operated the self-service checkout terminal 10 improperly for illicit purposes such as theft. For example, if the processing unit 26 determines that the user placed an item into the post-scan area 17 without having previously scanned or otherwise entered the item into the terminal 10, an entry is made in an event log corresponding to such activity. This is true since the user may have unintentionally operated the scanner 14 incorrectly thereby preventing the scanner 14 from reading the bar code printed on the item. However, the possibility does exist that the user may have intentionally prevented the scanner 14 from reading the bar code printed on the item (e.g. the user may have placed his or her thumb over the bar code during the scanning attempt). Therefore, an entry is made in an event log corresponding to such activity (i.e. placing an item in the post-scan area 17 without having first entered the item into the terminal 10).

Moreover, a separate event log may be maintained to track those occasions in which a user does not properly correct a prior misuse of the terminal 10. For example, if the processing unit 26 determines that the user placed an item into the post-scan area 17 without having previously scanned or otherwise entered the item into the terminal 10 in the manner discussed above, the processing unit 26 causes a message to be displayed on the display monitor 32 which instructs the user to remove the item from the post-scan area 17 and thereafter properly enter the item. A separate event log is maintained in order to track the number of occasions in which the user does not follow such instruction or performs an additional improper operation. For example, if subsequent to such instruction the user removes a different item, or no item at all, from the post-scan area 17, an entry is made into the event log associated with such activity.

Additional examples of event logs which may be maintained include an event log which tracks the number of occasions in which the user weighs an item, such as produce, with the product scale 12, but then places an item of a different weight in the post-scan area 17. Moreover, a separate event log may be provided to track the number of occasions in which a user voids a first item from his or her transaction, but then removes a second item of lesser value from the post-scan area 17. A separate event log may be maintained to track the dollar amount of the coupons which are entered by a given user. Yet further, a separate event log may be provided to track the amount of time which elapses from the point in time at which the user removes his or her items from the post-scan area 17 until the point in time at which the user tenders payment for his or her items.

Moreover, the memory device 27 maintains an electronic aggregate log. The aggregate log tracks the total of each of the various event logs. It should be appreciated that such an aggregate log is particularly useful for monitoring a user's "overall" operation of the self-service checkout terminal 10. In particular, while the occurrence of certain individual activities by a given user may not separately rise to a level of concern, the aggregate of such activities may be of concern to the retailer.

It should be appreciated that a separate, predetermined threshold value may be established for each of the numerous event logs and also the aggregate log. More specifically, a retailer may establish a threshold value for each of the logs that once equaled or exceeded causes the processing unit 26 to communicate with the network 25 in order to request intervention by store personnel. In particular, when a threshold value associated with one of the event logs or the aggregate log is equaled or exceeded, the processing unit 26 may communicate with the network 25 in order to page or otherwise alert the retailer's personnel as to certain events surrounding the operation of the self-service checkout terminal 10 by a given user. After being alerted in such a manner, the retailer's personnel will typically intervene into the user's transaction in order to either assist the user (in the case of inadvertent misuse of the terminal 10) or audit and/or discontinue the user's transaction (in the case of intentional misuse or theft). It should be appreciated that the processing unit 26 may communicate with the retailer's personnel via mechanisms other than a paging system associated with the network 25. For example, the self-service checkout terminal 10 may include a status light device (not shown) which displays a particular colored light when intervention by store personnel is needed. One status light device which is suitable for requesting intervention by store personnel is disclosed in copending U.S. patent application Ser. No. 08/998,210 (NCR Docket No. 7528) entitled "Method for Displaying the Status of a Self-Service Checkout Terminal" which was filed on Dec. 24, 1997, by Dusty Lutz, the disclosure of which is hereby incorporated by reference, and is assigned to the same assignee as the present invention.

The threshold value of each of the event logs and the aggregate log may be altered or otherwise varied based on a security level at which the self-service checkout terminal 10 is being operated. In particular, the self-service checkout terminal 10 may be operated at either a high security level, a medium security level, or a low security level. For example, intervention by store personnel may be requested by the terminal 10 if the event log associated with placement of unentered items into the post-scan area 17 equals or exceeds a value of three (3) when the self-service checkout terminal 10 is being operated at a medium security level. However, intervention may have been similarly requested if the event log associated with placement of unentered items into the post-scan area 17 equaled or exceeded a value of two (2) when the self-service checkout terminal 10 is being operated at a high security level. Moreover, intervention by store personnel may not be requested until the event log associated with placement of unentered items into the post-scan area 17 equals or exceeds a value of four (4) when the self-service checkout terminal 10 is being operated at a low security level.

Similarly, intervention by store personnel may be requested by the terminal 10 if the event log associated with improper removal of unentered items from the post-scan area 17 (e.g. when a user removes the wrong item, or no item at all, from the post-scan area 17 after having been instructed to do so) equals or exceeds a value of two (2) when the self-service checkout terminal 10 is being operated at either a medium or a low security level. However, intervention may have been similarly requested if the event log associated with improper removal of unentered items from the post-scan area 17 equaled or exceeded a value of one (1) when the self-service checkout terminal 10 is being operated at a high security level.

Moreover, the value at which an event log entry is made may also be altered or otherwise varied based on the security level at which the self-service checkout terminal 10 is being operated. For example, intervention by store personnel may be requested by the terminal 10 if the weight of an item, such as produce, as measured by the product scale 12 differs by more than one-fifth (⅕) of a pound from the weight of the item as measured by either the post-scan shelf scale 20 or the bagwell scale 22 when the self-service checkout terminal 10 is being operated at the medium security level. However, intervention by store personnel may be requested by the terminal 10 if the weight of an item, as measured by the product scale 12, differs by more than one-tenth (¹/₁₀) of a pound from the weight of the item, as measured by either the post-scan shelf scale 20 or the bagwell scale 22, when the self-service checkout terminal is being operated at the high security level. Moreover, intervention by store personnel may not be requested by the terminal 10 until the weight of an item, as measured by the product scale 12, differs by more than three-tenths (³/₁₀) of a pound from the weight of the item, as measured by either the post-scan shelf scale 20 or the bagwell scale 22, when the self-service checkout terminal 10 is being operated at the low security level.

It should be appreciated that the remaining event logs may also have varying threshold values based upon the level of security at which the self-service checkout terminal 10 is being operated. For example, the threshold associated with an event log which tracks the value of a given user's coupons may have a value of $0.50, $1.00, $2.00 when the terminal 10 is being operated at a high, medium, or low security level, respectively. Hence, the self-service checkout terminal 10 may request intervention by store personnel if the total coupon value associated with a given transaction exceeds $2.00 if the terminal 10 is being operated in at a low security level, whereas such intervention will be requested if the total coupon value exceeds $0.50 if the terminal 10 is being operated at a high security level. It should be appreciated that such intervention would allow store personnel to confirm the presence and applicability (i.e. the user actually selected the proper item listed on the face of the coupon) of each of the user's coupons.

The memory device 27 further maintains a security lookup table. As shown in Table 1 below, the security lookup table includes data indicative of the security level at which the self-service checkout terminal 10 is operated at various times of the day throughout a given day of the week. In particular, the security level at which the self-service checkout terminal 10 is operated is varied in order to coincide with times of relatively low or high usage of the terminal 10. More specifically, during periods of relatively high usage (i.e. periods of time in which a large number of users are present in the retailer's store), the self-service checkout terminal 10 may be operated at the low security level. Such operation reduces the number of occasions in which store personnel intervene into the user's transaction thereby allowing the user to complete his or her transaction more quickly. In addition, the terminal 10 continues to provide a certain level, albeit reduced, of security so as to decrease the number of occasions in which the user commits either an unintentional or intentional impropriety such as theft. It should be appreciated that the number of occurrences of intentional improprieties such as theft is relatively small during such periods of high usage thereby reducing the risk associated with operating the self-service checkout terminal 10 at the low security level. More specifically, during periods of high usage, a relatively large number of users are generally present in the checkout area of the retailer's store. Such users may be operating an adjacent self-service checkout terminal 10 or may be in a line or cue for a terminal which is being operated by another user. The presence of such other users serves as a psychological deterrent against the commission of an intentional impropriety such as theft.

Conversely, during periods of relatively low usage (i.e. periods of time in which a small number of users are present in the retailer's store), the self-service checkout terminal 10 may be operated at the high security level. It should be appreciated that the number of occurrences of intentional improprieties such as theft is relatively large during such periods of low usage thereby meriting the operation of the self-service checkout terminal 10 at the high security level. More specifically, during periods of low usage, relatively few users are present in the checkout area of the retailer's store. The absence of large numbers of users in the checkout area of the retailer's store may serve as a psychological motive to a user to commit an intentional impropriety such as theft. Hence, during such periods of relatively low usage, the self-service checkout terminal 10 is operated at a high security level.

An exemplary security lookup table is shown below in Table 1. Note that operation of the self-service checkout terminal 10 at the various security levels (e.g. low, medium, and high) is varied based on a current time value. The current time value includes (1) a time of day value (i.e. the time at which the transaction occurs), and (2) a day of the week value (i.e. the day of the transaction). It should be appreciated that although one embodiment of the security lookup table is herein described in Table 1, any configuration of the security lookup table may be used to fit the needs of a given retailer's operation. For example, the security lookup table may be altered to reflect periods of seasonal high usage such as those periods of times associated with a holiday.

TABLE 1

| Day of the Week Range | Time of Day Range | Security Level |
| --- | --- | --- |
| Monday–Friday | 8:00 AM–4:59 PM | Medium Security Level |
| Monday–Friday | 5:00 PM–6:29 PM | Low Security Level |
| Monday–Friday | 6:30 PM–8:59 PM | Medium Security Level |
| Monday–Friday | 9:00 PM–7:59 AM | High Security Level |

TABLE 1-continued

| Day of the Week Range | Time of Day Range | Security Level |
|---|---|---|
| Saturday–Sunday | 8:00 AM–10:59 AM | Medium Security Level |
| Saturday–Sunday | 11:00 AM–1:59 PM | Low Security Level |
| Saturday–Sunday | 2:00 PM–5:59 PM | Medium Security Level |
| Saturday–Sunday | 6:00 PM–7:59 AM | High Security Level |

Figure 4:
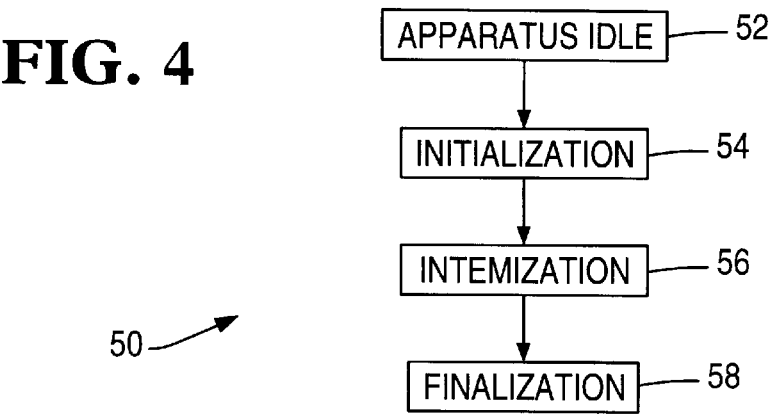
FIG. 4 is a flowchart setting forth a general procedure for checking out items through the self-service checkout terminal of FIG. 1.

Referring now to FIG. 4, there is shown a flowchart which sets forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 32 which instruct the user to (1) touch a particular area of the display monitor 32 or push a particular button on the data input device 34 in order to select a desired method of payment, and/or (2) identify himself or herself by inserting a shopping card, debit card, credit card, or smart card into the card reader 30.

At the completion of the initialization step 54, the routine 50 advances to an itemization step 56 where the user enters individual items for purchase by scanning the items across the scanner 14. Moreover, in step 56 the user enters items, such as produce items or the like, by weighing with the items with the product scale 12, and thereafter entering a product lookup code associated with the item via either the data input device 34 or by touching a particular area of the display monitor 32. Further, in step 56 the user may enter an item by manually entering the product code associated with the item via use of the data input device 34. Such manual entry of an item may be necessary for items which would otherwise be entered via the scanner 14 if the bar code printed on the item is not readable by the scanner 14. It may also be necessary during step 56 for the user to void entry of an item from the checkout procedure via use of the scanner 14 or the data input device 34. It should be appreciated that the self-service checkout terminal 10 may be configured such that the routine 50 allows experienced users of the self-service checkout terminal 10 to bypass the initialization step 52 thereby advancing directly to the itemization step 56. In such a configuration, the experienced user would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card account, or decreasing a value amount stored on a smart card or debit card via the card reader 30. It should be appreciated that in the case of when a user inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent user initiates a checkout procedure.

Figure 5:
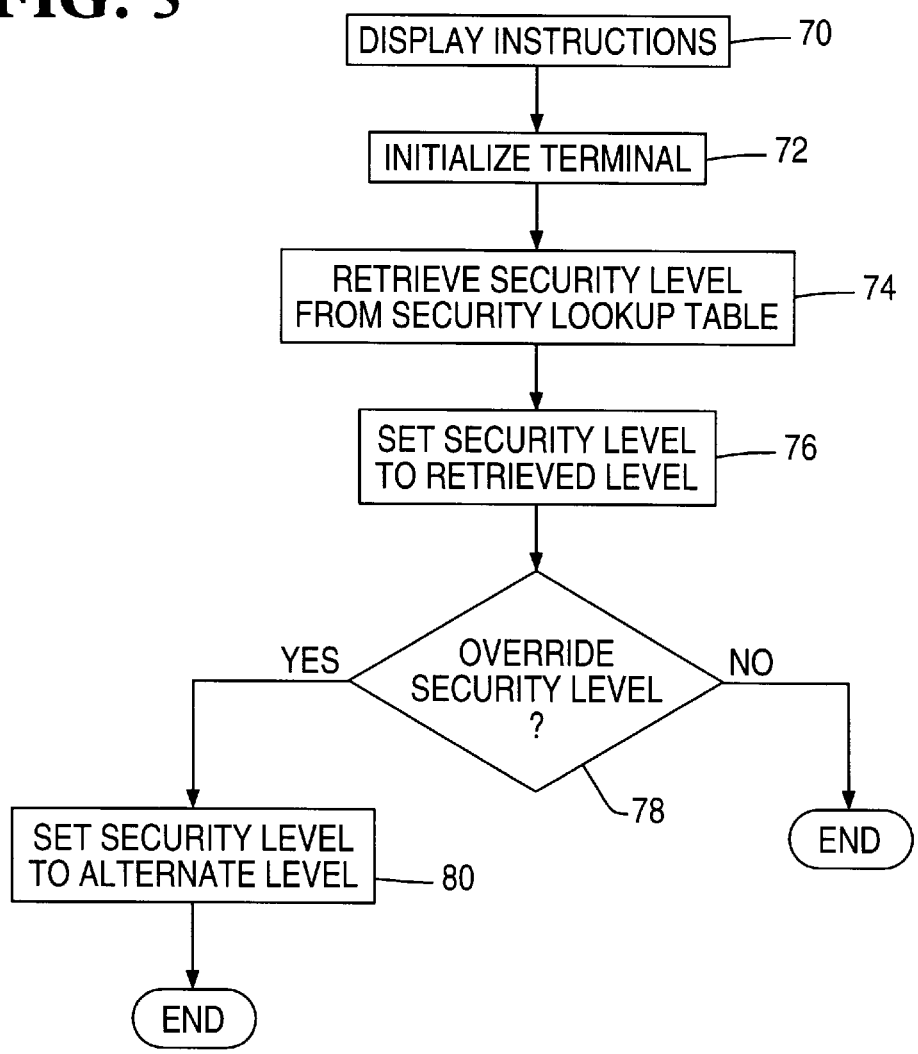
FIG. 5 is a flowchart setting forth in detail the initialization step 54 of the general procedure of FIG. 4.

Referring now to FIG. 5, there is shown a flowchart which sets forth the initialization step 54 of the general procedure 50 in greater detail. The routine 54 begins with step 70 in which one or more initialization instructions are displayed on the display monitor 32 which instruct the user to (1) select a desired method of payment, and/or (2) identify himself or herself by inserting a shopping card, debit card, credit card, or smart card into the card reader 30 (see FIG. 1). The routine 54 then advances to step 72.

In step 72, the processing unit 26 initializes the self-service checkout terminal 10. In particular, the processing unit 26 monitors the data communication lines 49 and 43 to determine the user has selected the desired method of payment by touching a particular key associated with the data input device 34 or by touching a particular touch screen area displayed on the display monitor 32, respectively. Furthermore, in step 72 the processing unit 26 monitors the data communication line 45 to determine if the user has identified himself or herself by inserting a shopping card, debit card, credit card, or smart card into the card reader 30. It should be appreciated that the self-service checkout terminal 10 may be configured such that the routine 54 allows experienced users of the self-service checkout terminal 10 to initialize the terminal 10 by scanning or otherwise entering his or her first item for purchase thereby postponing selection of a payment method until the finalization step 58, as discussed above. Hence, once the processing unit 26 has initialized the self-service checkout terminal 10, the routine 54 advances to step 74.

In step 74, the processing unit 24 determines the security level at which to operate the self-service checkout terminal 10 during the user's checkout transaction. In particular, the processing unit communicates with the memory device 27 in order to scan or otherwise query the security lookup table (see Table 1 above) so as to determine the security level at which to operate the self-service checkout terminal 10 during the user's checkout transaction. It should be appreciated that the processing unit 26 cross references both the day of the week and the time of day in order to determine the security level at which the self-service checkout terminal 10 is to be operated. In particular, the processing unit 26 determines a time of day value and a day of the week value associated with the transaction. For example, a transaction which begins at noon on Tuesday would have a time of day value of 12:00 PM and a day of the week value of Tuesday. Thereafter, the processing unit 26 determines the security level at which the self-service checkout terminal 10 is to be operated. In particular, the processing unit 26 compares the time of day value and the day of the week value to a time of day range and a day of the week range in order to determine the appropriate security level (see Table 1 above). For example, the transaction which begins at noon on Tuesday would have a medium security level associated therewith. Once the processing unit 26 has determined the security level at which the self-service checkout terminal 10 is to be operated during the user's checkout transaction, the routine 54 advances to step 76.

In step 76, the processing unit 26 sets the security level of the self-service checkout terminal 10 to the retrieved value. In particular, the processing unit 26 sets the threshold values of each of the event logs and the aggregate log to their respective values. For example, the threshold value associated with the event log which tracks those occasions in which the user places an unentered item in the post-scan area 17 is set to a value of three (3) if the self-service checkout terminal 10 is to be operated at a medium security level (e.g. the user is beginning his or her transaction at 2:30 on a Tuesday afternoon). The routine 54 then advances to step 78.

In step 78, the processing unit 26 determines if the security level has been overridden by the retailer's personnel such as a customer service manager. In particular, the security levels included in the security lookup table may be overridden by the customer service manager in order to allow the retailer to adjust the security level of the self-service checkout terminal 10 in the event of an unexpected change in the level of usage thereof. For example, if the retailer unexpectedly experiences relatively high usage of the self-service checkout terminal 10 during a period of time in which the retailer normally experiences relatively low usage, the customer service manager may override the security level included in the security lookup table. In particular, the customer service manager may change the security level at which the self-service checkout terminal 10 is operating from a high security level to a low security level thereby allowing the retailer to accommodate the unexpected high usage of the terminal 10.

It should be appreciated that the customer service manager may override the security level of the self-service checkout terminal 10 in any one of a number of different manners. For example, the customer service manager may enter an authorization code via either the data input device 34 or the touch screen associated with the display monitor 32. Moreover, the customer service manager may enter an authorization code via the network 25 thereby allowing the customer service manager to simultaneously override each of the self-service checkout terminals connected to the network 25. Hence, in step 78, the processing unit 26 monitors the data communication lines 43, 49, and 51 to determine if the customer service manager entered an authorization code via either the display monitor 32, the data input device 34, or the network 51, respectively, in order to override the security level retrieved from the security lookup table. If a particular signal which is indicative of such an authorization code is present on the data communication lines 43, 49, or 51, the routine 54 advances to step 80. If a particular signal which is indicative of su7ch an authorization code is not present on the data communication lines 43, 49, or 51, the routine 54 then ends thereby advancing the routine 50 (see FIG. 4) to the itemization step 56.

In step 80, the processing unit 26 sets the security level of the self-service checkout terminal 10 to the override value entered by the customer service manager. In particular, the processing unit 26 sets the threshold values of each of the event logs and the aggregate log to their respective values based on the security level entered by the customer service manager. For example, if the customer service manager enters an authorization code such that the self-service checkout terminal 10 is operated at a low security level in order to accommodate unexpected high usage of the terminal 10, the threshold value associated with the event log which tracks those occasions in which the user places an unentered item in the post-scan area 17 is set to a value of four (4). Once the self-service checkout terminal 10 has been set to the security level entered by the customer service manager, the routine 54 then ends thereby advancing the routine 50 (see FIG. 4) to the itemization step 56.

Figure 6A:
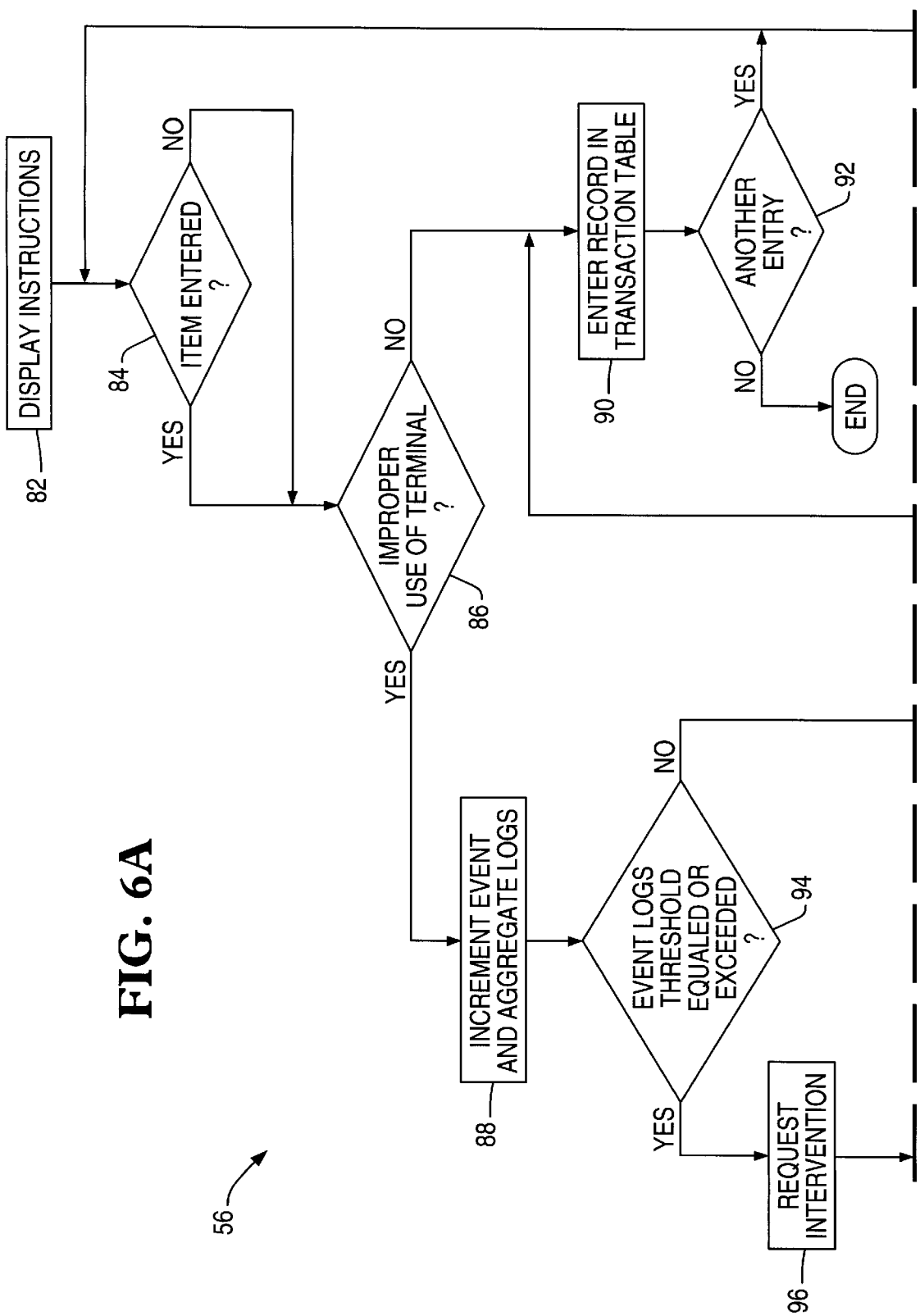
FIGS. 6A–6B is a flowchart setting forth in detail the itemization step 56 of the general procedure of FIG. 4.
Figure 6B:
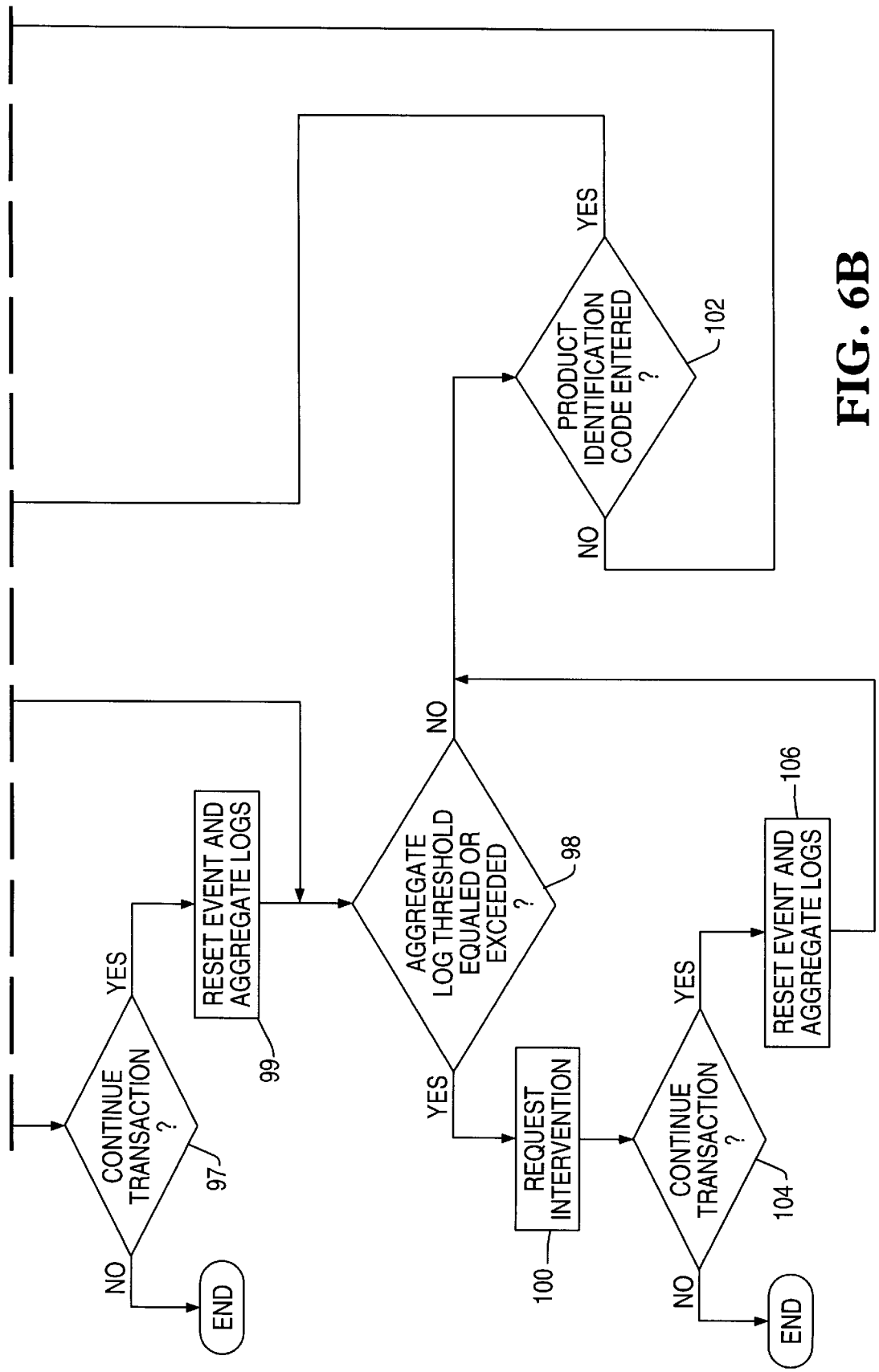

Referring now to FIG. 6, there is shown a flowchart setting forth the itemization step 56 in greater detail. After the initialization step 54 (see FIG. 4) is completed, the routine 56 advances to step 82 where a message is displayed on the display monitor 32 which instructs the user to either (1) pass or otherwise scan individual items across or adjacent the scanner 14 with the bar code containing the item's product identification code facing the scanning windows 14a, 14b, (2) place an individual item on the product scale 12 in order to be weighed, or (3) manually enter the product identification code associated with an item with the data input device 34, or any combination thereof.

The routine 56 then advances to step 84 where the processing unit 26 scans or reads the data communication lines 29, 43, and 49 in order to determine whether an item has been entered in the self-service checkout terminal 10. In particular, the processing unit 26 determines if (1) the scanner 14 has successfully read or otherwise captured the product identification code associated with an item, (2) the product identification code associated with an item has been entered via the touch screen portion of the display monitor 32, or (3) the product identification code associated with an item has been entered via the data input device 34. More specifically, the scanner 14 generates an output signal which is sent to the processing unit 26 once the scanner 14 successfully reads the product identification code associated with the item. Similarly, the display monitor 32 and the data input device 34 generates an output signal which is sent to the processing unit 26 once the product identification code has been entered by the user. If an item is successfully entered into the self-service checkout terminal 10, an item-entered control signal is generated and the routine 56 advances to step 86. If an item is not successfully entered into the self-service checkout terminal 10, the item-entered control signal is not generated, and the routine 56 advances to step 86.

In step 86, the processing unit 26 evaluates the item entry to determine if the self-service checkout terminal 10 is being used in an improper manner or in a manner which may require intervention by store personnel. In particular, the processing unit 26 determines if an improper-terminal-use activity has occurred. What is meant herein by the term "improper-terminal-use activity" is (1) activity by the user in which the user unintentionally operates the self-service checkout terminal 10 improperly, and (2) activity by the user in which it can be inferred with a high degree of confidence that the user intentionally operated the self-service checkout terminal 10 improperly for illicit purposes such as theft. For example, if the user attempted to scan the item with the scanner 14, but the product identification code associated with the item was not read by the scanner 14, the processing unit 26 concludes that an improper-terminal-use activity has occurred. Moreover, it should be appreciated that even if the product identification code associated with the item was successfully entered in step 84, the processing unit 26 may determine that an improper-terminal-use activity has occurred. For example, if the user scanned a first item, but then placed a second item of greater value into the post-scan area 17, the processing unit 26 concludes that an improper-terminal-use activity has occurred. For further example, if the user attempts to weigh an item such as produce with the product scale 12, but does not properly position the item on the product scale 12 thereby producing an erroneous weight value, the processing unit 26 concludes that an improper-terminal-use activity has occurred. Yet further examples of improper-terminal-use activities may include (1) failure to surrender an item after the item has been voided from the transaction, (2) weighing only a portion of an item (i.e. weighing only one banana, but placing four bananas into the post-scan area 17), and (3) placing an item into the post-scan area 17 without first attempting to scan or otherwise enter the item.

It should be appreciated that although numerous examples of improper-terminal-use activities have herein been described, numerous other types of improper-terminal-use activities may exist and occurrences thereof would be detected in step 86. Further examples of improper-terminal-use activities, along with a number of mechanisms and methods for detecting occurrence thereof, are disclosed in copending U.S. patent applications Ser. No. 08/895,084 entitled "Method and Apparatus for Verifying Identity of an Item Being Checked Out Through a Retail Checkout Terminal" which was filed on Jul. 16, 1997, by Joanne Walter; Ser. No. 08/735,424 entitled "Method and Apparatus for Providing Security for a Self-Service Checkout Station" which was filed on Oct. 22, 1996, by Joanne Walter and Tracy Flynn; Ser. No. 08/910,702 entitled "Method and Apparatus for Resetting a Product Scale of a Retail Checkout Terminal" which was filed on Aug. 13, 1997, by Dusty Lutz; Ser. No. 08/939,868 entitled "Method and Apparatus for Providing Security to a Self-Service Checkout Terminal" which was filed on Sep. 29, 1997, by John Addy and Jim Morrison; Ser. No. 08/991,060 (NCR Docket No. 7504) entitled "Method and Apparatus for Reducing Shrinkage During Operation of a Self-Service Checkout Terminal" which was filed on Dec. 15, 1997, by Jim Morrison and Joanne Walter; Ser. No. 08/990,241 (NCR Docket No. 7540) entitled "Method and Apparatus for Detecting Item Placement and Item Removal During Operation of a Self-Service Checkout Terminal" which was filed on Dec. 15, 1997, by Jim Morrison and Dusty Lutz; and Ser. No. 08/990,240 (NCR Docket No. 7562) entitled "Method and Apparatus for Detecting Item Substitutions During Entry of an Item into a Self-Service Checkout Terminal" which was filed on Dec. 15, 1997, by Dusty Lutz; along with copending U.S. Provisional Applications Serial No. 60/037,726 entitled "Method for Enhancing Security and Providing Assistance in the Operation of a Self-Service Checkout Terminal" which was filed on Feb. 7, 1997, by Ali Vassigh and Joanne Walter; Serial No. 60/037,725 entitled "Self-Service Checkout Terminal" which was filed on Feb. 7, 1997, by Stephen Swaine, Ali Vassigh, and Grant Paton; Serial No. 60/037,728 entitled "Method of Enhancing Security in a Self-Service Checkout Terminal" which was filed on Feb. 7, 1997, by John Addy and Marc Lynn. The disclosure of each of the above-identified patent applications and provisional applications is hereby incorporated by reference, and is assigned to the same assignee as the present invention.

Hence, in step 86, if the processing unit 26 concludes that an improper-terminal-use activity has occurred, an improper-use control signal is generated and the routine 56 advances to step 88. If the processing unit 26 concludes that an improper-terminal-use activity did not occur, the routine 56 advances to step 90.

In step 90, the processing unit 26 adds a record of the item entered in step 84 to the transaction table. In particular, the processing unit 26 communicates with the network 25 to obtain product information (e.g. description and price) associated with the entered item. Thereafter, the processing unit 26 updates the transaction table. More specifically, the processing unit 26 generates an output signal which is sent to the memory device 27 which causes the transaction table to be updated in the memory device 27 to include the product information associated with the entered item. A valid-use control signal is then generated, and the routine 56 advances to step 92.

In step 92, the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 then ends thereby advancing the routine 50 (see FIG. 4) to the finalization step 58. If a particular signal is not detected on either of the communication lines 43 or 49, the processing unit 26 determines that the user has additional items for purchase, and the routine 56 returns to step 84.

Returning now to step 86, if the processing unit 26 concludes that an improper-terminal-use activity has occurred, the routine 56 advances to step 88. In step 88, the processing unit 26 increments the appropriate event log or logs and the aggregate log by a predetermined value depending on the type of improper-terminal-use activity that was detected in step 86. In particular, as described above, an improper-terminal-use activity includes those occasions in which the user unintentionally operated the self-service checkout terminal 10 improperly, along with those occasions in which it can be inferred with a high degree of confidence that the user intentionally operated the self-service checkout terminal 10 improperly for illicit purposes such as theft. Hence in step 88, the processing unit 26 generates an output signal which is sent to the memory device 27 which causes the appropriate event log and the aggregate log to be incremented in the memory device 27 by a predetermined value depending on the type of improper-terminal-use activity that was detected in step 86. For example, if in step 86 the processing unit 26 determined that the user placed an unentered item into the post-scan area 17, the processing unit 26 would increment the event log associated with such activity and the aggregate log by a value of one. Then, after being instructed to remove the item from the post-scan area 17, if the user removed a different item, or no item at all, from the post-scan area 17, the processing unit 26 would increment both the event log associated with improper removal of items from the post-scan area 17 and the aggregate log by a value of one. The routine 56 then advances to step 94.

In step 94, the processing unit 26 compares the various event logs to their respective threshold values in order to determine if any of the event logs have a predetermined relationship therewith. In particular, if the respective value of any of the event logs equals or exceeds its respective threshold value, an intervention control signal is generated and the routine 56 advances to step 96. If the respective values of the event logs do not equal or exceed their respective threshold values, the routine 56 advances to step 98.

In step 96, the processing unit 26 requests intervention from store personnel. In particular, the processing unit 26 causes a personnel control signal to be sent to the network 25 which in turn pages or otherwise summons the retailer's personnel to intervene in the user's transaction. Moreover, as alluded to above, the self-service checkout terminal 10 may request intervention via use of a status light device (not shown). It should be appreciated that such a request for intervention by store personnel may be prioritized by the self-service checkout terminal 10. In particular, the self-service checkout terminal 10 may generate a first type of personnel control signal if intervention by store personnel is needed immediately. Alternatively, the self-service checkout terminal 10 may generate a second type of personnel control signal if intervention by store personnel is not required immediately. The routine 56 then advances to step 97.

In step 97, the processing unit determines if the user's transaction is allowed to continue. In particular, the customer service manager performs an audit or investigation of the user's transaction in response to the request for intervention in step 96 (if intervention was needed immediately). During such an audit, the customer service manager may compare the items placed in the post-scan area 17 (including the grocery bags 40) with the items entered into the transaction table in order to determine if items were added to the post-scan area 17 improperly. After performing an audit, the customer service manager decides whether the user can continue the transaction. In particular, the customer service manager may determine that the user was not intentionally using the self-service checkout terminal 10 in an improper manner thereby permitting the transaction to continue. For example, the customer service manager may determine that one or more of the components associated with the self-service checkout terminal 10 is malfunctioning thereby causing improper use of the terminal 10. A further example includes a situation in which the user inadvertently failed to follow the instructions displayed on the display monitor 32 and therefore requires assistance from the customer service manager in order to properly operate the self-service checkout terminal 10. If the customer service manager determines that the user's transaction should be permitted to continue, the customer service manager enters an authorization code via the data input device 34 or the touch screen area associated with the display monitor 32 thereby advancing the routine 56 to step 99. If the customer service manager determines that the user was intentionally using the self-service checkout terminal 10 in an improper manner in order to commit an impropriety such as theft, the customer service manager will enter a different authorization code via the data input device 34 or the touch screen area associated with the display monitor 32 thereby causing the processing unit 26 to cancel the user's transaction. It should be appreciated that cancellation of the user's transaction causes the routine 56 to end thereby returning the routine 50 to the idle step 52 (see FIG. 4) in which the self-service checkout terminal 10 will remain in the idle condition until initialized by a subsequent user.

In step 99, after the customer service manager has audited the user's transaction and entered the authorization code thereby allowing the transaction to continue, each of the event logs and the aggregate log are reset to their respective original values (e.g. zero). In particular, since the customer service manager has audited the user's transaction, each of the event logs and aggregate log are reset so that the transaction will not be interrupted during entry of subsequent items unless further improper-terminal-use activities cause any of the event logs and/or the aggregate log to again exceed their respective thresholds. The routine 56 then advances to step 98.

In step 98, the processing unit 26 compares the value of the aggregate log to its threshold value in order to determine if the aggregate log has a predetermined relationship therewith. In particular, if the value of the aggregate log equals or exceeds its threshold value, an intervention control signal is generated and the routine 56 advances to step 100. If the value of the aggregate log does not equal or exceed its threshold value, the routine 56 advances to step 102.

In step 100, the processing unit 26 requests intervention from store personnel. In particular, the processing unit 26 causes a personnel control signal to be sent to the network 25 which in turn pages or otherwise summons the retailer's personnel to intervene in the user's transaction. Moreover, as alluded to above, the self-service checkout terminal 10 may request intervention via use of a status light device (not shown). It should be appreciated that such a request for intervention by store personnel may be prioritized by the self-service checkout terminal 10. In particular, the self-service checkout terminal 10 may generate a first type of personnel control signal if intervention by store personnel is needed immediately. Alternatively, the self-service checkout terminal 10 may generate a second type of personnel control signal if intervention by store personnel is not required immediately. The routine 56 then advances to step 104.

In step 104, the processing unit determines if the user's transaction is allowed to continue. In particular, the customer service manager performs an audit or investigation of the user's transaction in response to the request for intervention in step 100. During such an audit, the customer service manager may compare the items placed in the post-scan area 17 (including the grocery bags 40) with the items entered into the transaction table in order to determine if items were added to the post-scan area 17 improperly. After performing an audit, the customer service manager decides whether the user can continue the transaction. In particular, the customer service manager may determine that the user was not intentionally using the self-service checkout terminal 10 in an improper manner thereby permitting the transaction to continue. For example, the customer service manager may determine that one or more of the components associated with the self-service checkout terminal 10 is malfunctioning thereby causing improper use of the terminal 10. A further example includes a situation in which the user inadvertently failed to follow the instructions displayed on the display monitor 32 and therefore requires assistance from the customer service manager in order to properly operate the self-service checkout terminal 10. If the customer service manager determines that the user's transaction should be permitted to continue, the customer service manager enters an authorization code via the data input device 34 or the touch screen area associated with the display monitor 32 thereby advancing the routine 56 to step 106. If the customer service manager determines that the user was intentionally using the self-service checkout terminal 10 in an improper manner in order to commit an impropriety such as theft, the customer service manager will enter a different authorization code via the data input device 34 or the touch screen area associated with the display monitor 32 thereby causing the processing unit 26 to cancel the user's transaction. It should be appreciated that cancellation of the user's transaction causes the routine 56 to end thereby returning the routine 50 to the idle step 52 (see FIG. 4) in which the self-service checkout terminal 10 will remain in the idle condition until initialized by a subsequent user.

In step 106, after the customer service manager has audited the user's transaction and entered the authorization code thereby allowing the transaction to continue, each of the event logs and the aggregate log are reset to their respective original values (e.g. zero). In particular, since the customer service manager has audited the user's transaction, each of the event logs and aggregate log are reset so that the transaction will not be interrupted during entry of subsequent items unless further improper-terminal-use activities cause any of the event logs and/or the aggregate log to again exceed their respective thresholds. The routine 56 then advances to step 102.

In step 102, the processing unit 26 determines if a product identification code associated with an item was entered in step 84. In particular, as alluded to above, even though the processing unit 26 determined in step 86 that the self-service checkout terminal 10 was operated improperly by the user, a product code associated with an item may have actually been entered in the self-service checkout terminal 10 in step 84. For example, the user may have properly scanned an item with the scanner 14, but thereafter either intentionally or unintentionally placed a different item into the post-scan area 17. In such a case, the processing unit 26 would determine that an improper-terminal-use activity has occurred even though a product identification code associated with the item has been entered. Hence, in step 102, the processing unit 26 determines if a product identification code associated with an item has been entered in order to enter a record associated with the item into transaction table, if necessary. If a product identification code associated with an item was entered in step 84, the routine 56 advances to step 90 to enter a record of the item into the transaction table in the manner previously discussed. If a product identification code associated with an item was not entered in step 84, the routine 56 loops back to step 84 in order to monitor a subsequent entry attempt of the item.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, although the self-service checkout terminal 10 is herein described as being operable at any one of three different security levels (i.e. a high security level, a medium security level, or a medium security level), any number of different security levels may be used. For example, the security lookup table (see Table 1 above) may be configured to include five different security levels.

Yet further, although the self-service checkout terminal 10 is herein described as detecting a terminal parameter value associated with the time of the transaction (e.g. time of day and day of the week) in order to select and/or adjust the security level at which the terminal 10 is being operated and has significant advantages thereby in the present invention, certain of such advantages may be achieved by detecting other terminal parameter values in order to select and/or adjust the security level at which the terminal 10 is being operated. For example, the self-service checkout terminal 10 may be equipped with a mechanism (not shown) for detecting the length of the line or queue of users which is present at the terminal 10 and thereafter adjust the security level of the terminal 10 based on the length of the line. Moreover, the self-service checkout terminal 10 may detect or otherwise monitor the types of products which are being entered into the terminal 10 during a given checkout transaction in order to adjust the security level. For example, if a relatively large number of items such as baby food and diapers are being entered into the terminal 20, the terminal 10 may be operated at a low security level. Yet further, the terminal 10 may detect or otherwise monitor the percentage of time over a given period of time in which the terminal 10 is being used and thereafter adjust the security level. For example, if over a given period of time, the terminal 10 is being operated 95% of the time, the terminal 10 may adjust the security level such that the terminal 10 is being operated at a low security level.

What is claimed is:

1. A method of providing security for a self-service checkout terminal, comprising the steps of:

determining a current time value;

operating the terminal at a first security level if the current time value is within a first predetermined time range; and operating the terminal at a second security level if the current time value is within a second predetermined time range.

2. The method of claim 1, wherein:

the current time value includes a time-of-day value, the first security level operating step includes the step of operating the terminal at the first security level if the time-of-day value is within a first predetermined time-of-day range, and the second security level operating step includes the step of operating the terminal at the second security level if the time-of-day value is within a second predetermined time-of-day range.

3. The method of claim 1, wherein:

the current time value includes a day-of-week value, the first security level operating step includes the step of operating the terminal at the first security level if the day-of-week value is within a first predetermined day-of-week range, and the second security level operating step includes the step of operating the terminal at the second security level if the day-of-week value is within a second predetermined day-of-week range.

4. The method of claim 1, further comprising the step of maintaining an electronic log during operation of the terminal, wherein:

the first security level operating step includes the step of requesting intervention if the magnitude of the electronic log is greater than or equal to a first log threshold value, and the second security level operating step includes the step of requesting intervention if the magnitude of the electronic log is greater than or equal to a second log threshold value.

5. The method of claim 1, wherein the terminal includes a weight scale, further comprising the step of verifying the weight of an item with the weight scale, wherein:

the first security level operating step includes the step of requesting intervention if the weight of the item is outside of a first tolerance range, and the second security level operating step includes the step of requesting intervention if the weight of the item is outside of a second tolerance range.

6. The method of claim 1, further comprising the step of determining a total coupon value of a transaction, wherein:

the first security level operating step includes the step of requesting intervention if the total coupon value exceeds a first dollar amount, and the second security level operating step includes the step of requesting intervention if the total coupon value exceeds a second dollar amount.

7. A method of providing security for a self-service checkout terminal, comprising the steps of:

determining a time-of-day value and a day-of-week value;

operating the terminal at a first security level if (i) the time-of-day value is within a first predetermined time-of-day range, and (ii) the day-of-week value is within a first predetermined day-of-week range; and operating the terminal at a second security level if (i) the time-of-day value is within a second predetermined time-of-day range, and (ii) the day-of-week value is within a second predetermined day-of-week range.

8. The method of claim 7, further comprising the step of maintaining an electronic log during operation of the terminal, wherein:

the first security level operating step includes the step of requesting intervention if the magnitude of the electronic log is greater than or equal to a first log threshold value, and the second security level operating step includes the step of requesting intervention if the magnitude of the electronic log is greater than or equal to a second log threshold value.

9. The method of claim 7, wherein the terminal includes a weight scale, further comprising the step of verifying the weight of an item with the weight scale, wherein:

the first security level operating step includes the step of requesting intervention if the weight of the item is outside of a first tolerance range, and the second security level operating step includes the step of requesting intervention if the weight of the item is outside of a second tolerance range.

10. The method of claim 7, further comprising the step of determining a total coupon value of a transaction, wherein:

the first security level operating step includes the step of requesting intervention if the total coupon value exceeds a first dollar amount, and the second security level operating step includes the step of requesting intervention if the total coupon value exceeds a second dollar amount.

11. A method of providing security for a self-service checkout terminal, comprising the steps of:

detecting a terminal parameter value;

operating the terminal at a first security level if the terminal parameter value is within a first predetermined terminal parameter range; and operating the terminal at a second security level if the terminal parameter value is within a second predetermined terminal parameter range.

12. The method of claim 11, wherein:

the terminal parameter value includes a time-of-day value, the first security level operating step includes the step of operating the terminal at the first security level if the time-of-day value is within a first predetermined time-of-day range, and the second security level operating step includes the step of operating the terminal at the second security level if the time-of-day value is within a second predetermined time-of-day range.

13. The method of claim 11, wherein:

the terminal parameter value includes a day-of-week value, the first security level operating step includes the step of operating the terminal at the first security level if the day-of-week value is within a first predetermined day-of-week range, and the second security level operating step includes the step of operating the terminal at the second security level if the day-of-week value is within a second predetermined day-of-week range.

14. The method of claim 11, further comprising the step of maintaining an electronic log during operation of the terminal, wherein:

the first security level operating step includes the step of requesting intervention if the magnitude of the electronic log is greater than or equal to a first log threshold value, and the second security level operating step includes the step of requesting intervention if the magnitude of the electronic log is greater than or equal to a second log threshold value.

15. The method of claim 11, wherein the terminal includes a weight scale, further comprising the step of verifying the weight of an item with the weight scale, wherein:

the first security level operating step includes the step of requesting intervention if the weight of the item is outside of a first tolerance range, and the second security level operating step includes the step of requesting intervention if the weight of the item is outside of a second tolerance range.

16. The method of claim 11, further comprising the step of determining a total coupon value of a transaction, wherein:

the first security level operating step includes the step of requesting intervention if the total coupon value exceeds a first dollar amount, and the second security level operating step includes the step of requesting intervention if the total coupon value exceeds a second dollar amount.

* * * * *